Figures 1, 2:
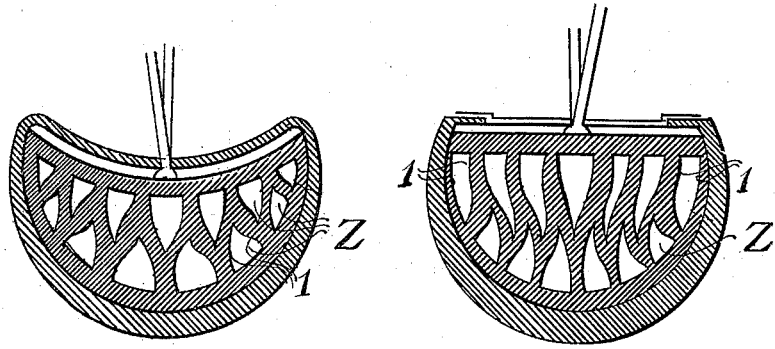

(No Model.)

J. v. KÉMÉNDY.
ELASTIC TIRE.

No. 513,643. Patented Jan. 30, 1894.

Witnesses:
E. K. Sturtevant
A. S. Büsing

Inventor.
Jeno von Keméndy,
by
Richards
attorneys.

UNITED STATES PATENT OFFICE.

JENO V. KÉMÉNDY, OF MUNICH, GERMANY.

ELASTIC TIRE.

SPECIFICATION forming part of Letters Patent No. 513,643, dated January 30, 1894.

Application filed December 17, 1892. Serial No. 455,534. (No model.)

*To all whom it may concern:*

Be it known that I, JENO V. KÉMÉNDY, a subject of the Emperor of Austria-Hungary, residing at Munich, Bavaria, Germany, have invented certain new and useful Improvements in Elastic Gum Bolsters, of which the following is a specification.

The present invention relates to an elastic bolster, the construction of which furnishes a great elasticity together with a great endurance.

The invention is especially applicable for tires to take the place of pneumatic tires which have the disadvantage of becoming useless by the least accident while the repairing of the same is very difficult.

The essential part of the invention consists of a bolster made up of a row of cells arranged in a certain way next to each other and over each other, which fit into each other, the material of which the bolster is made being rubber or some other elastic material.

In the drawings, Figures 1, 2, 3 and 4 show cross sections of the bolster. Fig. 5, is a cross, and Fig. 6, a longitudinal section.

Figures 3, 5:
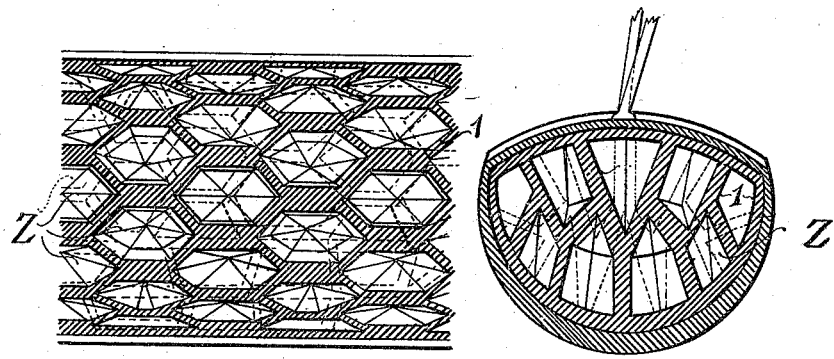
Figures 4, 6:
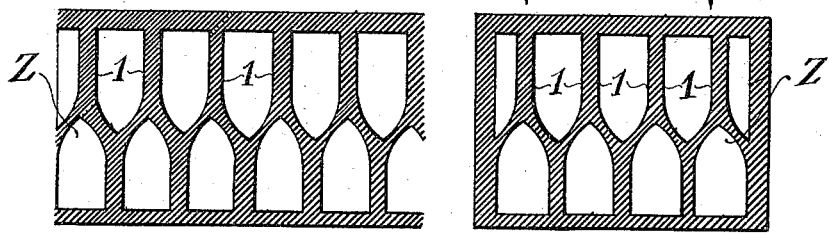

In Figs. 1, 2, and 3, the bolster is shown in the form of a tire for a wheel. It will be seen that the lower row of cells Z, terminate in a pointed arched shape. The row of cells above this first or lower row is arranged in reverse position, with the pointed ends downward and alternating in position with the lower cells. The relative position of the cells is shown clearly in the cross sections and the same arrangement is carried out longitudinally of the bolster. Thus the cells overlap each other and penetrate every part of the bolster. The result is that when a pressure is exercised in the direction of the arrows as in Fig. 4, for instance, the walls $l$, will communicate the same downward to the arches of the cells of the lower row. The latter yield and there is a tension very favorable for the producing of elasticity in the elastic walls of the cells. Of course the air existing in the different cells works also elastically. The cells can be of any shape; their cross section can be triangular, square or as may be desired.

If it is desired to use the bolsters for tires where the cross section of the same must evenly resist pressure, the cells or their walls must be arranged radially as in Figs. 2 and 3. This must especially be the case because a side pressure is often exercised upon the wheel tires.

When used for tires a great advantage arises that even if an accident happens to the same the working of the tires is not weakened and the repairing of the same can be made in a very simple way by putting a new piece in the place of that which becomes defective.

I claim—

A tire or bolster having a series of upper and a series of lower cells formed by integral transverse partition walls, said lower cells having pointed upper ends alternating with the pointed lower ends of the upper cells whereby a zig-zag wall is formed intermediate of the sides of the tire, said wall being connected with the outer walls of the tire by the side walls of the cells, substantially as described.

In testimony that I claim the foregoing as my invention I have signed my name in presence of two subscribing witnesses.

J. V. KÉMÉNDY.

Witnesses:
EMIL HENZEL,
ALBERT WEICKMANN.